Sept. 21, 1965  C. C. WHISTLER, JR  3,206,941
REFRIGERATING APPARATUS WITH FROST ATTRACTING EVAPORATOR
Filed June 12, 1963  2 Sheets-Sheet 1

INVENTOR.
Charles C. Whistler, Jr.
BY
His Attorney

Sept. 21, 1965   C. C. WHISTLER, JR   3,206,941
REFRIGERATING APPARATUS WITH FROST ATTRACTING EVAPORATOR
Filed June 12, 1963   2 Sheets-Sheet 2

INVENTOR.
Charles C. Whistler, Jr.
BY
His Attorney 3,206,941
REFRIGERATING APPARATUS WITH FROST
ATTRACTING EVAPORATOR
Charles C. Whistler, Jr., Dayton, Ohio, assignor to
General Motors Corporation, Detroit, Mich., a corporation of Delaware
Filed June 12, 1963, Ser. No. 287,296
2 Claims. (Cl. 62—227)

This invention pertains to refrigerating apparatus and more particularly to refrigerators which are free of frost in the storage spaces.

Refrigerators which are frost free in the storage spaces are very popular. However, the sales of such models have been limited by their high cost. The frost free refrigerators which are presently manufactured have their compartments separately insulated and have their evaporator compartment separate from the other compartments with air circulation between the compartments provided by a fan. This construction inherently is considerably more expensive than conventional refrigerators.

It is an object of this invention to provide a simple inexpensive refrigerator which will be free of frost to the extent of the customer's experience in normal usage and yet be substantially lower in cost than the frost free refrigerators now on the market.

It is another object of this invention to provide a refrigerator with both above and below freezing storage in which the surfaces for freezing and for keeping cold frozen products are kept free of frost without the use of a fan.

It is another object of this invention to provide a refrigerator in which the freezing evaporator is located in the freezing compartment and the frost attracting evaporator is associated with the freezing evaporator in such a way that it attracts frost by natural gravity circulation and prevents defrosting of the freezing evaporator and the articles cooled thereby.

These and other objects are obtained in the forms shown in the drawings in which the evaporating means is provided in two sections. The first section comprises a freezing plate for freezing products and also for supporting frozen products to be kept in frozen condition. The second section is used for attracting frost from the freezing plate and frozen products and the remainder of the freezing section of the refrigerator and also includes a portion for cooling the above freezing compartment of the refrigerator. The two sections are connected in series in the refrigerating circuit with a restrictor in between the two sections and operated at a sufficiently low temperature so as to maintain the low freezing temperature for freezing ice and maintaining frozen products. Frost is attracted to the second section from the first section by reason of its much colder temperature. Provisions are made for defrosting either during every idle period or at longer intervals.

Further objects and advantages of the present invention will be apparent from the following description, reference being had to the accompanying drawings, wherein a preferred embodiment of the present invention is clearly shown.

Figure 1:
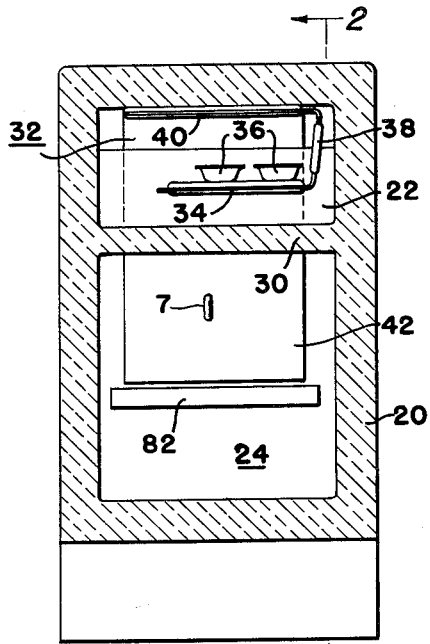
FIGURE 1 is a front vertical sectional view, partly diagrammatic taken along the line 1—1 of FIGURE 2, illustrating a refrigerator embodying one form of my invention.
Figure 2:
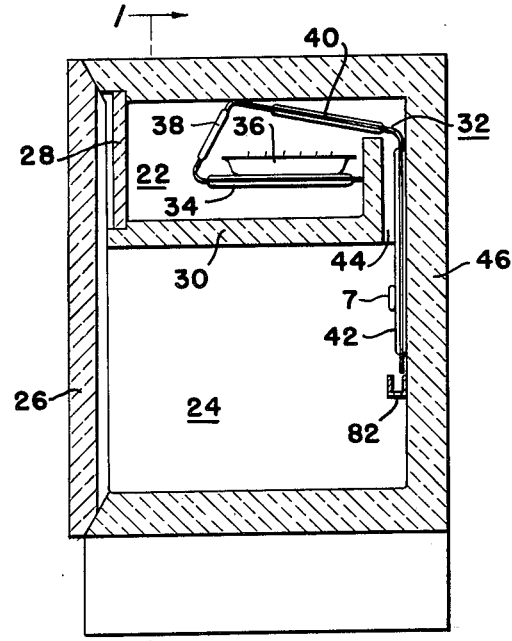
FIGURE 2 is a side sectional view taken substantially along the line 2—2 of FIGURE 1.

Referring now more particularly to FIGURES 1 and 2 there is shown a two compartment insulated refrigerator cabinet 20 having an upper below freezing compartment 24. The two compartments are closed by a common outer door 26. In addition, the below freezing compartment 22 is provided with an individual insulated door 28 to prevent any air from the above freezing compartment 24 from gaining access to the compartment 22. The two compartments 22 and 24 are also separated by the insulated wall 30 which forms a baffle between the two compartments. A single roll bonded plate type of evaporating means 32 is provided for cooling both compartments 22 and 24.

This evaporating means 32 includes a first freezing plate section 34 adapted to cool the compartment 22 and also to support the ice trays 36. This freezing plate section 34 connects through an integral narrow strip 38 with a frost attracting section 40 located in the upper portion of the freezing compartment 22 above the first plate section 34. The two sections 34 and 40 combine to keep the compartment 22 at a cold freezing temperature such as zero degrees Fahrenheit. The evaporating means 32 also includes a third section 42 extending through a slot 44 at the rear of an insulating partition 30 down along the rear wall 46 into the above freezing compartment 24.

Figure 3:
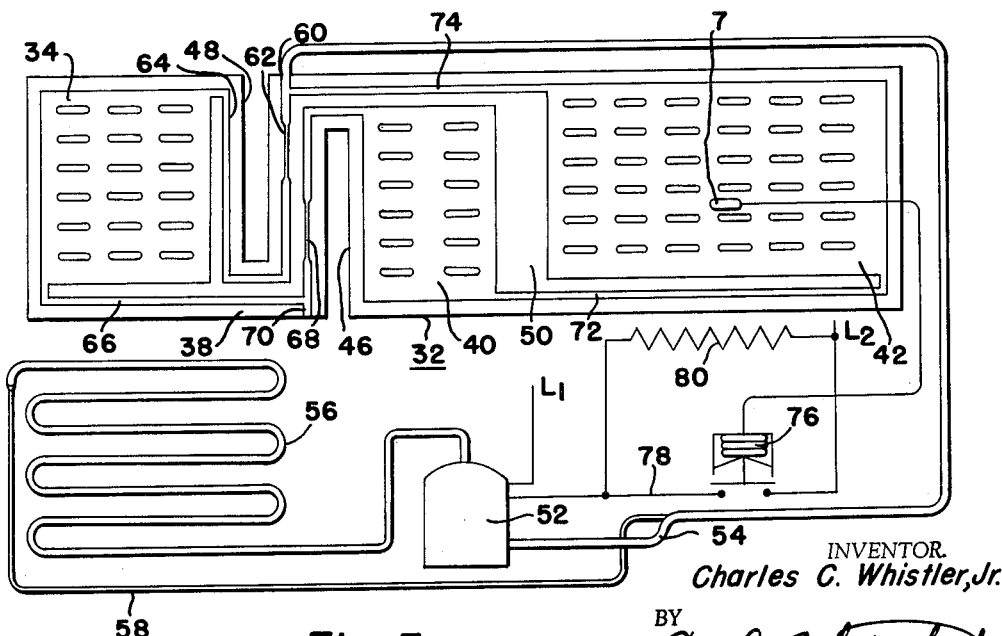
FIGURE 3 is a view partly diagrammatic of the refrigerating system and also the control system of the refrigerator shown in FIGURES 1 and 2.

As illustrated in FIGURE 3 the entire evaporating means 32 is formed of a single roll bonded sheet metal member formed by the roll bonding process disclosed in Patent 2,712,736 issued July 12, 1955. The evaporating means 32 in the form of the single roll bonded member has the slots 46 and 48 cut therein from opposite edges so as to substantially separate and minimize heat transfer between the freezing plate portion 34 and the remaining sections 40 and 42 of the evaporating means 32. This leaves the narrow strip 38 connecting the plate section 34 with the remaining portions of the evaporator 32. The evaporator means 32 is bent by deforming the strip portion 38 so as to bring the freezing plate section 34 below the sloping section 40 as shown in FIGURES 1 and 2. The portion 50 between the sections 40 and 42 is bent also as shown in FIGURE 2. The section 40 is placed at such an angle that any moisture thereon will adhere to it and flow downwardly to the bottom of the section 42.

The entire refrigerating system is shown diagrammatically in FIGURE 3 and includes a sealed motor compressor unit 52 which withdraws evaporated refrigerant from the suction conduit 54 forwards the compressed refrigerant to a condenser 56 where the refrigerant is liquefied and forwarded through a capillary supply conduit 58 having its second portion extending through the inside of the suction conduit 54 with both conduits entering the evaporating means 32 through an entrance 60. This arrangement may be similar to that shown in the Simmons Patent 2,933,905 issued April 26, 1960. The capillary tube 58 extends to the restrictor portion 62 located in the connecting strip 38.

From the restrictor portion 62 the predominately liquid refrigerant flows through the passage 64 to the freezing plate section 34 where some of the liquid refrigerant evaporates at a temperature of from 15° to 20° above the temperature of the remaining sections 40 and 42 of the evaporating means 32. The particular temperature maintained in the freezing plate section 34 varies with the room temperature. For example, in a 70° room the plate 34 may be maintained between −15° and −18° Fahrenheit while in a 110° room the freezing plate 34 may vary between −40 F. and −8° F. After partially evaporating in the plate 34 the refrigerant flows through the passage 66 and the second restrictor 68 to the frost attracting plate section 40. The frost attracting plate secion 40 is maintained preferably at a temperature of 15° to 20° F. lower than the temperature of the freezing plate 34. This temperature differential is sufficient to cause any mosiure in the compartment 32 and particularly any moisture on the plate 34 to migrate through the air to the frost attracting plate 40. This migration is aided by the circulation of the air through natural convection. Additional evaporation takes place in the frost attracting plate 40 to accomplish this refrigeration at the lower temperature.

After passing through the frost attracting plate section 40 the liquid and evaporated refrigerant flows through the passage 72 to the third section 42 of the evaporating means 32. Here the remainder of the liquid refrigerant evaporates at substantially the same temperature as in the plate section 40. Only gaseous refrigerant flows out of the section 40 through the passage 74 to the combined inlet and outlet section 60 and enters the suction conduit 54 for its return to the motor compressor unit 52. The evaporating means 32 is provided with a plug 70 which closes to the outside, the branch extending to passage 66 and the restrictor 68.

The operation of the sealed motor compressor unit 52 is controlled by a thermostatic switch 76 which controls the connection between the supply conductor $L_2$ and the conductor 78 connecting with one terminal of the motor compressor unit 52. The other terminal of the motor compressor unit 52 connects with the supply conductor $L_1$. The thermostatic switch 76 is operably connected to and operates in accordance with the temperature of the thermostatic bulb 7 mounted upon the section 42 of the evaporating means 32. The switch 76 is preferably set to operate on a defrost cycle and preferably opens when a temperature of about −35° F. is reached and recloses when a temperature of about +35° F. is reached. For the purpose of making more rapid the defrosting of the sections 42 and 40, there may be provided a defrost heater 80 which extends in heat transfer relation with the section 42 or with both sections 40 and 42. This defrost heater 80 is connected in shunt with the switch 76 as shown in FIGURE 3 so that it is energized whenever the switch 76 opens and is de-energized whenever the switch 76 closes. This defrost heater 80 therefore makes more rapid the heating of the sections 40 and 42 until defrosting occurs at the end of every idle period. Beneath the section 42 of the evaporating means 32, there is provided on the rear wall 36 a drain pan 82 which will collect any defrost water flowing from the evaporating means 32.

Figure 4:
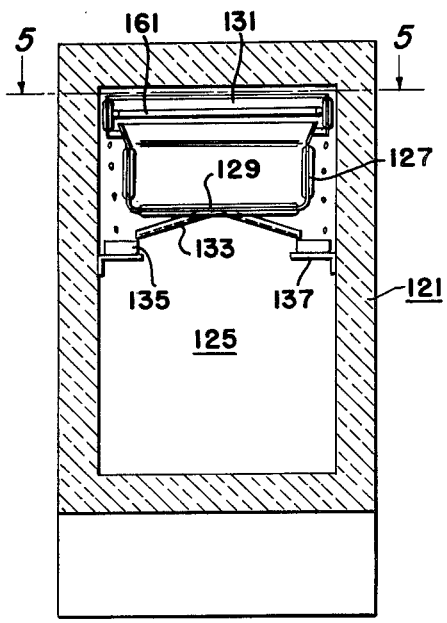
FIGURE 4 is a fragmentary sectional view of the modified form of the invention taken substantially along the lines 4—4 of FIGURE 5.
Figure 5:
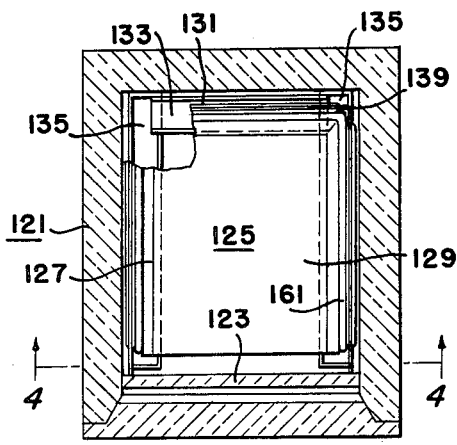
FIGURE 5 is a top horizontal sectional view taken substantially along the line 5—5 of FIGURE 4.

Referring now more particularly to FIGURES 4 and 5 showing the second form, there is shown an insulated refrigerator cabinet 121 provided with a door opening adapted to be closed by an insulated cabinet door 123. Located in the upper portion of the enclosed insulated compartment 125 is a U-shaped freezing evaporator 127 provided with a freezing shelf portion 129 extending across the bottom adapted to support ice trays and frozen packages between the vertical legs. Located above and just outside the periphery of the U-shaped evaporator 127 is a second U-shaped evaporator 131 which is U-shaped when looking down from the top as in FIGURE 5. The two U-shaped evaporators 127 and 131 are connected by a restricted connection 139. As illustrated in FIGURE 5 this U-shaped evaporator 131 is located just outside the periphery of the U-shaped evaporator 127 which is U-shaped when viewed from the front as in FIGURE 4. Below the shelf portion 129 of the U-shaped evaporator 127 is a drain pan 133 which slopes downwardly toward each side from the center point or centerline of evaporator 127. Directly below the frost attracting evaporator 131 is a U-shaped trough 135 supported on ledges 137 extending inwardly from the walls of the cabinet 121.

The evaporator 127 will operate at temperatures between about −15° to −18° F. in a 70° room and about −4° to −8° F. in a 110° room. The frost attracting evaporator 131 will operate at a temperature about −30° to −35° F. in a 70° room and a temperature of about −25° to −30° F. in a 110° room. The lower portion of the compartment 125 will be cooled by natural convection of air from the two evaporators 127 and 131 as well as by the drain pans 133 and 135. There will also be a natural circulation of air above the drain pan 133 which will carry moisture from the U-shaped freezing evaporator 127 to the U-shaped frost attracting evaporator 131 through the migration of water vapor. The difference in temperature of about 15° to 20° F. between the two evaporators is sufficient to cause any frost which may momentarily collect on the evaporator 127 to sublime and be transmitted as moisture vapor to the frost attracting evaporator 131.

The refrigerating system is generally similar to that shown in FIGURE 3. As illustrated diagrammatically in FIGURE 8, the compressor 141 through the suction conduit 143 withdraws evaporated refrigerant from the frost attracting evaporator 131 and forwards the compressed refrigerant through a condenser 145 to the first restrictor 147 which controls the flow of liquid refrigerant into the freezing evaporator 127. The temperature differential between the freezing shell 129 and the frost attracting plate 131 is provided by the restrictor 139 which restricts the flow of liquid and evaporated refrigerant from the freezing evaporator 127 into the frost attracting plate 131 so as to maintain a temperature differential of about 15° to 20° between these two portions of the evaporating means.

Figure 8:
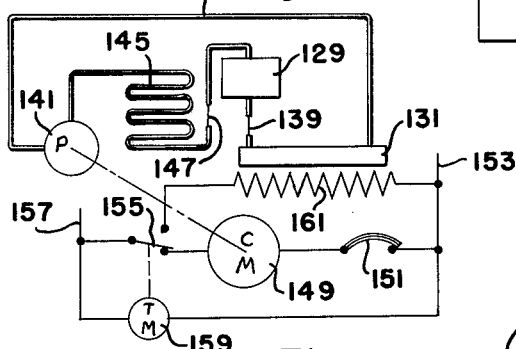
FIGURE 8 is a wiring diagram showing the control system suitable for the two forms shown in FIGURES 4 to 7 inclusive.

As further illustrated in FIGURE 8, the compressor 141 is driven by an electric motor 149 which is connected through a conventional thermostatic switch 151 to the supply conductor 153. The compressor motor 149 also normally connects through the double-throw switch 155 to the second supply conductor 157. Once a day or at any other desired interval, the timer motor 159 which is likewise connected across the supply conductors 153 and 157 operates the double-throw switch 155 so as to connect the supply conductor 157 with the defrost heater 161 which is associated in heat transfer relation with the frost attracting evaporator 131 so as to melt the frost therefrom. This assures that the frost attracting evaporator 131 will always be able to attract the frost away from the freezing plate 129.

Figure 7:
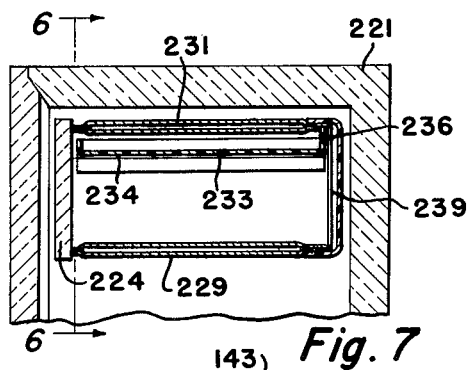
FIGURE 7 is a fragmentray vertical sectional view taken substantially along the line 7—7 of FIGURE 6.
Figure 6:
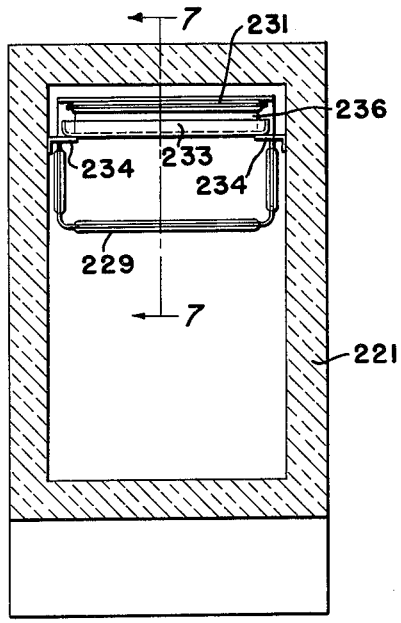
FIGURE 6 is a front vertical sectional view taken substantially along the line 6—6 of FIGURE 7 of another modified form of the invention.

Referring now to FIGURES 6 and 7, there is shown a third form of the invention. In this form there is likewise a U-shaped freezing plate 229 similar to the plate 129 in FIGURES 4 and 5. It is connected through a strip restrictor 239 with a frost attracting plate 231 located above the freezing plate 229. The interior of the U-shaped freezing plate is closed by an individual insulated door 224. Directly beneath the frost attracting plate 231 is a drip tray 233 which is slidably mounted on the side ledges 234. The rear edge of the tray 233 is provided with a scraper of a suitable relatively hard plastic extending substantially into contact with the bottom of the frost attracting plate 231 as shown in FIGURES 6 and 7. To remove the frost from the bottom of the plate 231 so as to maintain its frost attracting efficiency, the tray 233 is pulled forward so that the scraper 236 scrapes the frost from the bottom of the frost attracting plate 231 until it is substantially entirely cleared of frost. This maintains the frost attracting efficiency of the plate 231. The system is housed in the cabinet 221 which may be similar to the cabinet 121 in FIGURES 4 and 5. The refrigerating system may be like the one shown in FIGURE 8. However, the defrost control system including the timer motor 159, the switch 155 and the heater 161 may be omitted for FIGURES 6 and 7 inasmuch as the scraper 236 is used to remove the frost from the bottom of the plate 231.

Thus, in each of the forms, I have located a frost attracting plate operating at a substantially lower temperature than the freezing plate in a position above the freezing plate so that through natural circulation and migration of moisture vapor the frost will be attracted from the freezing plate to the frost attracting plate. Through this arrangement frost is prevented from forming on the frozen packages stored on the freezing plate and the user experiences the advantages of frost-free refrigeration.

While the embodiments of the present invention as herein disclosed constitute preferred forms, it is to be understood that other forms might be adopted.

What is claimed is as follows:

1. A refrigerator including insulated walls enclosing a compartment to be cooled, a baffle dividing said compartment into an upper freezing compartment and a lower above freezing compartment, an evaporating means having a freezing plate portion in the lower portion of said upper compartment adapted to support ice trays and a frost attracting portion in said upper compartment above said freezing plate portion, and means for cooling said frost attracting portion to a lower temperature than said freezing plate portion, said frost attracting portion extending from said upper compartment past said baffle to said lower compartment.

2. A refrigerator including insulated walls enclosing a compartment to be cooled, a baffle dividing said compartment into a below freezing compartment and an above freezing compartment, an evaporating means having a first section adapted to support an ice tray and a second section having a first portion located in said below freezing compartment and a second portion in heat transfer with said above freezing compartment, cooling means for cooling said second section to a lower temperature than said first section, said second section having its first portion in said below freezing compartment located to provide a natural draft flow from it to said first section for assisting in the removal of frost from said first section, and temperature responsive means operatively connected to said cooling means for starting the operation of said cooling means in response to a predetermined temperature above freezing of said second section and for stopping the operation of said cooling means at a predetermined temperature below freezing of said second section.

References Cited by the Examiner
UNITED STATES PATENTS

| | | | |
|---|---|---|---|
| 2,979,922 | 4/61 | De Witte | 62—523 X |
| 3,008,306 | 11/61 | Hiler | 62—283 |
| 3,096,629 | 7/63 | Rembold | 62—283 |
| 3,108,450 | 10/63 | Crotser | 62—283 |

ROBERT A. O'LEARY, *Primary Examiner.*

MEYER PERLIN, *Examiner.*